United States Patent
Mennekens et al.

(10) Patent No.: US 6,324,159 B1
(45) Date of Patent: Nov. 27, 2001

(54) METHOD AND APPARATUS FOR CODE DIVISION MULTIPLE ACCESS COMMUNICATION WITH INCREASED CAPACITY THROUGH SELF-NOISE REDUCTION

(75) Inventors: Jan Mennekens; Carl Mertens, both of Brasschaat; Lieven Philips, Aarschot; Jurgen Vandermot, Leuven; Jan Vanhoof, Wijgmaal, all of (BE)

(73) Assignee: Sirius Communications N.V., Rotselsar (BE)

( * ) Notice: Subject to any disclaimer, the term of this patent is extended or adjusted under 35 U.S.C. 154(b) by 0 days.

(21) Appl. No.: 09/306,589

(22) Filed: May 6, 1999

Related U.S. Application Data

(60) Provisional application No. 60/084,439, filed on May 6, 1998.

(51) Int. Cl.$^7$ .................................................. H04J 11/00
(52) U.S. Cl. .................................... 370/203; 370/320
(58) Field of Search .......................... 370/203, 208–211, 370/342, 529, 487; 375/140–146, 152, 285, 340–348, 130, 224, 150; 455/522, 69

(56) References Cited

U.S. PATENT DOCUMENTS

| | | |
|---|---|---|
| 5,327,455 | 7/1994 | De Gaudenzi et al. . |
| 5,327,467 | 7/1994 | De Gaudenzi et al. . |
| 5,872,810 | 2/1999 | Philips et al. . |
| 6,108,317 * | 8/2000 | Jones et al. ........................... 370/320 |
| 6,141,373 * | 10/2000 | Scott ................................... 375/150 |

FOREIGN PATENT DOCUMENTS 0 767 544 A2   4/1997   (EP) .

OTHER PUBLICATIONS

R. De Gaudenzi, C. Elia, R. Viola, Bandlimited Quasi–Synchronous CDMA: A Novel Satellite Access Technique for Mobile and Personal Communication Systems, IEEE Journal on Selected Areas in Communication, vol. 10, No. 2, Feb. 1992.

* cited by examiner

*Primary Examiner*—Wellington Chin
*Assistant Examiner*—Prenell Jones
(74) *Attorney, Agent, or Firm*—Knobbe, Martens, Olson & Bear, LLP

(57) ABSTRACT

A method of generating a waveform with a plurality of orthogonal PN codes for use in a communications network utilizing quasi-synchronous code division multiple access. The orthogonal PN codes modulate multiple data streams together with a non-orthogonal PN code having desirable auto-correlation properties. The result is a complex signal with time-aligned PN codes.

4 Claims, 2 Drawing Sheets

METHOD AND APPARATUS FOR CODE DIVISION MULTIPLE ACCESS COMMUNICATION WITH INCREASED CAPACITY THROUGH SELF-NOISE REDUCTION

RELATED APPLICATION

This application claims the benefit of the filing date of U.S. patent application Ser. No. 60/084,439, filed on May 6, 1998, for "METHOD AND APPARATUS FOR CODE DIVISION MULTIPLE ACCESS COMMUNICATION WITH INCREASED CAPACITY THROUGH SELF-NOISE REDUCTION" to Mennekens, et al.

FIELD OF THE INVENTION

The invention is situated in the field of Quasi Synchronous Code Division Multiple Access combined with Time Division Duplexing.

STATE OF THE ART

CDMA (Code Division Multiple Access) is one of the leading technologies in today's and future wireless and wireline communications systems.

Also known as Direct Sequence Spread Spectrum, CDMA is the best known representative of the class of spread spectrum modulation schemes. A CDMA waveform is generated by spreading (EXOR-ing) the data stream with a PN-code, resulting in a higher bandwidth, usually at lower power spectral density. Different users are multiplexed by using orthogonal or quasi-orthogonal codes.

CDMA is used for a variety of reasons. CDMA has its origin in the military, where use of PN-codes (Pseudo Noise) was exploited for the sake of its Low Probability of Intercept (LPI) or its Low Probability of Detection (LPD)). Since the late eighties, civil applications started to be developed, and have now reached a high level of maturity and market penetration. Advantages of spread spectrum include the inherent interference rejection capabilities, the efficient way for multiplexing multiple services, the higher capacity, a more efficient use of the spectrum and the lower terminal costs.

In satellite communications, CDMA is being exploited for low rate, medium rate as well as broadband type of communications. Low rate applications include a.o. SMS (Short Messaging Services), E-mail over satellite, remote meter reading, voice and data services (fax), and positioning and geolocation applications.

When used in the VHF and UHF bands, one talks about the so-called 'Little LEO' (Low Earth Orbit) applications. CDMA is used for its capability of coping with high interference levels in these bands, and because it allows to multiplex a high amount of users with limited protocol overhead. In order to provide global coverage, they are usually store-and-forward satellite systems with sophisticated OBP (On-Board Processing) capabilities.

Data and fax services using CDMA are found in the L and S bands (in the case of the so-called 'big LEO' constellations) and Ku-bands (when using transponders of GEO satellites). Different systems can share the same part of the spectrum. Cost-effective terminals are possible by exploiting a high degree of on-chip integration.

The Ku-band frequencies are mostly used by geostationary satellites, for applications such as DBS (Direct Broadcasting by Satellite). With the enormous growth of the demand for medium rate data services (mostly for the transport of Internet data), transponders in Ku-band are increasingly used also for implementing these data services (multiples of 64 kbps net user data rate).

CDMA-based solutions have an important cost advantage over the traditional PSK-based VSAT solutions. Ground station development is facilitated using the CDMA DataSat Development System. Other application examples in the Ku-band include the combination of terrestrial low cost networks (based on DECT) with a S-CDMA (synchronous CDMA) satellite for multiplexing the different telephone channels. In more and more cases, CDMA is being used as an overlay to existing satellite services. This is a very efficient use of spread spectrum in view of the limited spectrum being available. One such example is D-SNG (Digital satellite News Gathering), where the CDMA-based coordination channels are put on top of the transponder QPSK DVB (Digital Video Broadcasting) signals.

Besides the ongoing developments using existing GEO capacity, LEO-based satellite systems are under development to provide true broadband access to individual users, using CDMA technology. Several Mbit/s can be offered to the individual user. In some cases, these spread spectrum high-rate applications share the spectrum with other, non-CDMA services, by realizing links with very low power spectral density.

CDMA Applications

Probably the beat known satellite application using CDMA technology is navigation. Both GPS (Global Positioning System) and GLONASS (GLobal Navigation Satellite System, the Russian counterpart) use Direct Sequence Spread Spectrum waveforms for obtaining accurate pseudo-range measurements, which are the raw data to calculate a position fix. GPS has been complemented with the EGNOS (European Geostationary Navigation Overlay System) and the American WAAS (Wide Area Augmentation System), to increase the performance.

Sirius Communications is working towards the new European proposed GNSS-2 (Global Navigation Satellite System), which will provide higher accuracy and increased data rate, using more sophisticated waveforms. Besides the vast consumer market for standard receivers, there's also a professional market for RTK (real-Time Kinematic) receivers. These applications exploit the increased accuracy associated with tracking (or pseudo-tracking) of the P-Code (Precision Code) of CPS or GLONASS satellites. Alternative navigation systems are being developed, based on combined pseudo-range and Doppler measurements.

In wireless terrestrial communications, one can make a distinction between applications in licensed and in unlicensed bands.

UMTS Applications

In licensed bands, the best known system under development is the UMTS (Universal Mobile Telecommunications System), based on W-CDMA (Wideband CDMA) technology. Worldwide, this development fits in the IMT-2000 (International Mobile Telephone System) initiative from the ITU, which aims at realizing a true worldwide applicable 3G standard. The benefits of CDMA exploited here are the ability to merge different types of services (voice, data, video) over the same band, using orthogonal PN sequences of different lengths, leading to the best capacity (bits/Hz). This so-called 3G (3rd Generation) cellular networks will be commercially exploited from 2001 on, as an extension to the worldwide deployed GSM networks.

The provision of the license-free ISM(Industrial, Scientific and Medical) bands has boosted a lot of other terrestrial wireless applications. Well-known ISM bands are the 902–928 MHz band in the US, and the 2.4–2.4835 GHz band worldwide. CDMA is used here for its ability to share the same spectrum with other applications. Short range and Long range communications are being realized in these shared bands, efficiently rejecting the MAI (Multiple Access Interference). Data rates of several hundreds of kilobits per second are possible in this way.

Furthermore, applications such as from CATV modems and powerline modems also benefit CDMA, as once again the unwanted unpredictable interference (e.g. ingress noise cancelled) is efficiently through the processing gain of the spread spectrum modulation scheme.

U.S. Pat. No. 5,872,810 and European Patent Application EP-A-0767544 describe a flexible hardware platform on which any PN code family can be downloaded on on-chip RAM; the PN code properties and their influence on the performance of a CDMA link can be analyzed with this platform and these documents further describe a CDMA transceiver integrated circuit on which any PN codes can be stored on on-chip RAM.

De Gaudenzi et al. describe in U.S. Pat. No. 5,327,467 a CDMA-based system primarily of interest for mobile communications.

In U.S. Pat. No. 5,327,455, they describe a QPSK/CDMA modulation scheme, using preferentially phased Gold codes for spreading the data streams;

In R. De Gaudenzi, C. Elia and R. Viola, "Bandlimited quasi-synchronous CDMA: A novel access technique for mobile and personal communication systems," IEEE Selected Areas in Communications, vol. 10, no. 2, pp. 328–348, February 1992, CDMA-base satellite communications system exploiting Quasi-Synchronous CDMA in order to obtain a high efficiency together with interference rejection capabilities are described.

AIMS OF THE INVENTION

A primary aim is to provide a new method of multiplexing users in a network using QS-CDMA combined with TDD.

A further aim is to provide an apparatus that comprises said method.

Another aim is to provide a QS-CDMA-TDD network comprising a base station and user terminals

SUMMARY OF THE INVENTION

A first aspect of the present invention is a method for constructing orthogonal codes of length N, comprising the subsequent steps of:

Determining the balanced vectors of length N, being all possible cross-correlation vectors resulting from zero cross-correlation of codes of length N, Taking an arbitrary code of length N, and perform bitwise XOR-ing with all the balanced vectors mentioned above, to produce a set of codes with which the arbitrary code is orthogonal, Performing bitwise XOR-ing of the balanced vectors determined in the first step, Adding the code to a set of orthogonal codes if the result of the previous step is balanced, and Performing said steps until said set of orthogonal codes is complete.

Another aspect of the present invention is a method for deriving alternative sets of orthogonal codes, starting from a given orthogonal code set represented as a matrix in N*N matrix format with N even for binary codes, and integer for non-binary codes:

Exchanging columns in said matrix;

Exchanging rows in said matrix;

Inverting columns in said matrix;

Inverting rows in said matrix.

A further aspect of the present invention is a method for deriving a subset out of N codes of length N (N even for binary codes, and integer for non-binary codes), for which all mutual cross-correlation functions are zero over more than 1 subsequent point, starting with the first point of the cross-correlation function, comprising the steps of:

Taking an orthogonal code set,

Applying the steps as described hereabove to group the zero's in the cross-correlation function as the first points of the cross-correlation function;

Investigating the auto-correlation functions during the search process, in order to retain the solutions which have a well-peaked response, which is established by the randomizing effect of applying the steps of claim 2.

Another aspect of the present invention is a method for deriving M orthogonal codes of length N+M, wherein a set of M orthogonal codes of length N and a set of M orthogonal codes of length M respectively are concatenated. Another aspect of the present invention is a method for constructing binary codes out of a combination of two different sets, comprising the steps of:

Taking a first code of one of said sets as generator;

Taking a second code of one of said sets as seed;

Replacing a bit of said first code by the corresponding bit of said second code if said corresponding bit is a zero, or replace said bit by the bit-inverse of said corresponding bit of said second code if said corresponding bit is a one.

Another aspect of the present invention is a method for a fast acquisition, using codes with equally-spaced peaks, comprising the steps of:

Search for a auto-correlation peak;

Test for the validity of the choice;

If the choice is not correct, immediately test the next auto-correlation peak.

Another aspect of the present invention is a method to provide an even cross-correlation on the first symbol sent, comprising a partial duplication before and after the symbol of interest. Another aspect of the present invention is an apparatus with a TDD layer for the QS-CDMA return link, Dynamic Code Allocation and Contention Resolution comprising the following cycles:

Log-On cycle

Collision Resolving cycle

Acknowledging cycle

Another aspect of the present invention is a method for constructing non-binary digital orthogonal code sequences of length N, with N any natural number, comprising the steps of:

Taking the unity base in the N-dimensional vector space, V, +, ·;

Applying consecutive base transformations to said base;

Representing the resulting base vectors by their coordinates in the N-dimensional vector space.

Said base transformations can comprise the steps of:

Taking 2 base vectors out of the N base vectors and determining the plane defined by said 2 base vectors.

Rotate said 2 base vectors over the same angle in said plane.

Another aspect of the present invention is a method to generate a waveform with a plurality of orthogonal PN codes, to modulate a plurality of data streams, together with a non-orthogonal PN-code, having good auto-correlation properties, comprising the steps of:

Taking a plurality of orthogonal codes that are used to spread a plurality of data streams;

Combining each of said spread data streams with in-phase BPSK modulations, and performing an addition, after optional gain control of each spread stream to obtain first signals;

Defining a PN-code with good auto-correlation properties, and combining said code with BPSK modulation, which is orthogonal (90 degrees out-of-phase) with said BPSK modulations to obtain second signals;

Combining said first and second signals as a complex signal with time-aligned PN-codes.

A method to demodulate said waveform can comprise the steps of:

Searching the PN Code start of said code with good auto-correlation properties;

Tracking said PN code with good auto-correlation properties;

Despread and demodulate said data streams which are time-aligned with said PN-code with good auto-correlation properties.

Another aspect of the present invention is a apparatus for generating and demodulating of said waveform. The apparatus can be comprised in an Integrated circuit.

DETAILED DESCRIPTION OF THE INVENTION

Figure 1:
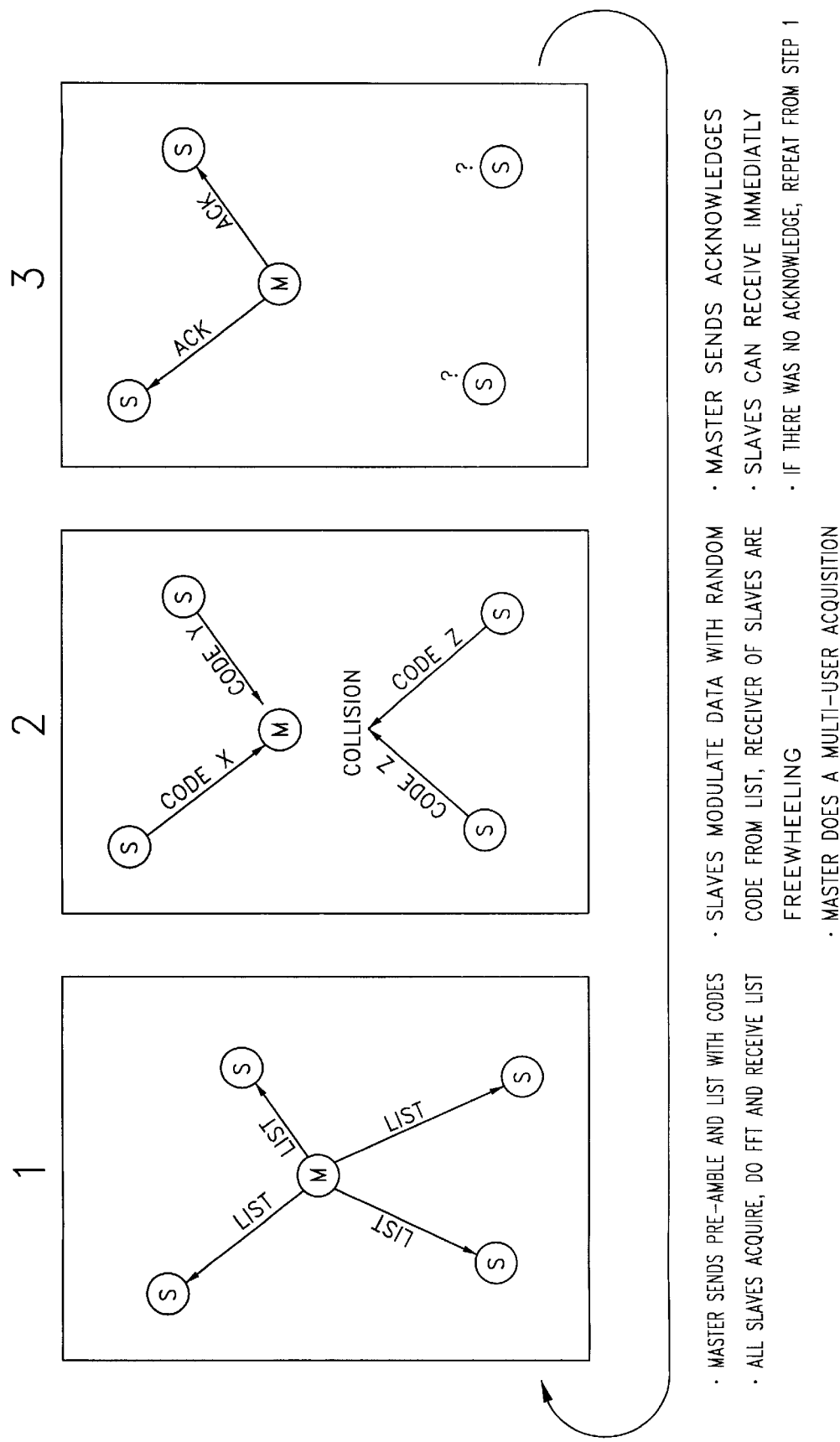
FIG. 1 illustrates an example dynamic code allocation and contention resolution cycle in a wireless communication network of the present invention.

The invention is a method of multiplexing users in a network using QS-CDMA combined with TDD. The Quasi-Synchronous Communication in the return link (i.e. from user terminal to base station) is realized by RX/TX switching at the user terminals based on reception of an end-of-transmit bit. Due to propagation time differences, the arrival times of symbol edges at the base station side are not perfectly synchronous. However, the codes used are such that the cross-correlation is minimal. In a described variant of the system, perfectly zero cross-correlation is obtained between the quasi-synchronous return links. The net effect is a minimized or zero self-noise, increasing the available Eb/Nø and ameliorating the BER, compared to systems with self noise. The net effect is an increased capacity for the same Eb/Nø and BER as n systems with self-noise. Code construction methods are described in the invention.

The application domain of the invention comprises (non-limitative list): satellite communications with mobile and fixed terminals, cellular communications, short-range terrestrial communications (like for data collection), CATV upstream/downstream modems, powerline modems, copper-wire telephone lines.

The following abbreviations are used in this patent application:

BER: Bit Error Rate
BPSK: Binary Phase Shift Keying
CATV: Community Antenna Television, i.e. cable TV
CDMA: Code Division Multiple Access
Chip: PN-Code bit
CSM: Code Shift Modulation
DSRC: Dedicated Short Range Communication
Eb: Energy per bit
Nø: Noise Power Density
PN: Pseudo Noise
QS-CDMA: Quasi Synchronous CDMA
RX: Receive
S-CDMA: Synchronous CDMA
TDD: Time Division Duplexing
TDMA: Time Division Multiple Access
TX: Transmit The invention will be illustrated using several non-limiting examples and figures.

Truly orthogonal PN codes which are currently used, such as Walsh codes in the IS-95 system or OVSF (Orthogonal Variable Spreading Factor) codes in the UMTS system, lack the possibility of being used for chip chase acquisition. In systems where composed waveforms are not required, the truly orthogonal codes derived in this invention can be used for chip phase acquisition, while full orthogonality (and hence absence of cross-correlation) is preserved, and alleviating the need for power control;

Existing quasi-synchronous CDMA proposals can be simplified using the method described in this invention to guarantee even cross-correlation over the uncertainty range of the chip phase control loop. An important application is mobile satellite communications, where a relaxed control loop is sufficient to keep the cross-correlation low, with only a small penalty in capacity loss.

For short-range applications, the TDD network is of particular interest because it provides dynamic multiple access capabilities without a chip phase control loop.

These methods and implementations are particularly useful in the increasing number of CDMA-based terrestrial and satellite proprietary applications which are currently developed.

EXAMPLE 1

A Method for the Construction of Orthogonal Binary Codes

If two codes are orthogonal then the result of the cross-correlation function is zero.

$$(CC(A,B)=0 \iff (A \text{ XOR } B) \text{ is balanced})$$

If PN-Code A and PN-Code B are orthogonal (with A XOR B=R) and if PN-Code A and PN-Code C are orthogonal (with A XOR C=S) and if PN-Code R and PN-Code S are orthogonal then PN-Code B and PN-Code C are orthogonal. In other words, the initial orthogonal PN-code set {A,B} has been extended with the new PN-Code C to a new orthogonal set {A,B,C}.

$$
\begin{aligned}
CC(R, S) = 0 &\iff (R \text{ XOR } S) \text{ is balanced} \\
&\text{substitution} \\
&\iff ((A \text{ XOR } B) \text{ XOR } (A \text{ XOR } C)) \text{ is balanced} \\
&x \text{ XOR } (y \text{ XOR } z) = (x \text{ XOR } y) \text{ XOR } z = x \text{ XOR } y \text{ XOR } z \\
&x \text{ XOR } y = y \text{ XOR } x \\
&\iff ((A \text{ XOR } A) \text{ XOR } (B \text{ XOR } C)) \text{ is balanced} \\
&x \text{ XOR } x = 0 \\
&\iff (0 \text{ XOR } (B \text{ XOR } C)) \text{ is balanced}
\end{aligned}
$$

-continued

```
x XOR 0 = x
    <=>   (B XOR C) is balanced
    <=>   CC(B, C) = 0
```

EXAMPLE 1 A

```
A=1001, B=0011 => R=A XOR B=1001 XOR 0011=1010 (balanced)
A=1001, C=1111 => S=A XOR C=1001 XOR 1111=0110 (balanced)
R=1010, S=0110 =>   R XOR S=1010 XOR 0110=1100 (balanced)
               =>   B XOR C=0011 XOR 1111=1100 (balanced)
A, B and C are a set of three orthogonal codes.
```

These steps can be repeated with all the PN-Codes that are orthogonal with A, until the results aren't balanced anymore. The number of codes that are balanced is:

$$n!/((n/2)!*(n/2)!)$$

with n=number of chips in the PN-Code and n is always even.

EXAMPLE 1 B

```
n = 4 =>   4! / (2! * 2!) = 6
       =>  6 balanced 4-bit PN-Codes
       =>  0011   0101   0110   1001   1010   1100
```

The decimal representation of these codes is: 3, 5, 6, 9, 10 and 12

If one takes an arbitrary 4-bit PN-code an, wants to find all the PN-codes that are orthogonal with this arbitrary PN-Code, one can use the balanced codes and XOR them with the arbitrary PN-Code. This will result in a set of PN-Codes that are orthogonal.

```
X XOR balanced_code = Y   <=>   X XOR Y = balanced_code
                          <=>   CC(X, Y) = 0
```

EXAMPLE 1 C

Decimal representation of the binary code is used. Arbitrary code=13 (=1101), balanced codes={3, 5, 6, 9, 10, 12}

```
13 XOR 3 = 14          13 XOR 14 = 3              CC(13, 14) = 0
13 XOR 5 = 8           13 XOR 8 = 5               CC(13, 8) = 0
13 XOR 6 = 11   <=>    13 XOR 11 = 6      <=>     CC(13, 11) = 0
13 XOR 9 = 4           13 XOR 4 = 9               CC(13, 4) = 0
13 XOR 10 = 7          13 XOR 7 = 10              CC(13, 7) = 0
13 XOR 12 = 1          13 XOR 1 = 12              CC(13, 1) = 0
```

We now have all the PN-Codes that are orthogonal with the arbitrary PN-code, by checking the cross-correlation of balanced results, we can find PN-Codes that are mutually orthogonal and so extend the orthogonal set of PN-Codes. As an example, one can check the result of 13 XOR 14 (=3) with all other results.

```
3 XOR 5 = 6           CC(14, 8) = 0              CC(13, 14, 8) = 0
3 XOR 6 = 5           CC(14, 11) = 0             CC(13, 14, 11) = 0
3 XOR 9 = 10   <=>    CC(14, 4) = 0      <=>     CC(13, 14, 4) = 0
3 XOR 10 = 9          CC(14, 7) = 0              CC(13, 14, 7) = 0
3 XOR 12 = 15         NOT balanced
```

One can repeat this check with the result of 3 XOR 5 (=6) and all other balanced results.

```
6 XOR 5 = 3           CC(8, 11) = 0              CC(13, 14, 8, 11) = 0
6 XOR 10 = 12  <=>    CC(8, 4) = 0       <=>     CC(13, 14, 8, 4) = 0
6 XOR 9 = 15          NOT balanced
```

One can repeat the check again with the result of 6 XOR 5 (=3) and the one of 6 XOR 10 (=12)

3XOR12=15<=>NOT balanced

So (8,11,13,14) and (4,8,13,14) are orthogonal code sets.

EXAMPLE 2

A Method for Deriving Alternative Sets of Orthogonal Codes

If one has a set of orthogonal codes, presented in matrix format, (with the first even cross-correlation point equal to zero), then a new set of orthogonal codes can be obtained by:

A: Permutation of the columns;
B: Permutation of the rows;
C: Inverting an arbitrary column;
D: Inverting an arbitrary row.

EXAMPLE 2 A 4 orthogonal codes as starting point.

| 0000 | col2 | 0000 | col4  | 0001 | row 4 | 0001 |
|------|------|------|-------|------|-------|------|
| 0101 | ↑    | 0011 | ↓     | 0010 | ↓     | 0010 |
| 0011 | col3 | 0101 | !col4 | 0100 | !row4 | 0100 |
| 0110 |      | 0110 |       | 0111 |       | 1000 |

This is in fact a set suited for CSM which is orthogonal.

EXAMPLE 3

A Method for the Construction of Even Zero Cross-correlation Codes for a Number of Consecutive Points Perform the manipulations on a set of orthogonal codes, like in example 2, in order to obtain a subset of codes with a number of consecutive points (greater than 1) equal to zero. Investigate the auto-correlation functions during the search process in order to retain the solutions which have a well peaked response.

EXAMPLE 4

A Method for the Construction of Even Zero Cross-correlation Codes of Length N+M, Given Orthogonal Codes of Length N and M These codes are generated by concatenating the codes with length N and M in order to obtain a new code with length N+M.

EXAMPLE 4 A

N=8 and M=4, then 4 orthogonal codes of length 12 can be made.

EXAMPLE 5
A Method for Constructing Codes Out of a Combination of Two Different Sets
1. Take one code (or code family) A (the 'generator')
2. Take a second code (or code family) B (the 'seed')
3. Replace every bit of code A by code B, taking code B if the bit in code A is zero, taking the bit-inverse of code B if the bit in code A is one.

This gives a new code of length A * B, called a 'genetic' code

EXAMPLE 5 A

| | |
|---|---|
| Code A = | 1010, Code B = 1110 |
| | => combined (genetic) code =    0001 1110 0001 1110 |
| | !B     B    !B     B |

Properties regarding auto- and cross-correlation of the 'generator' code are preserved, but mixed/modified with the properties of the 'seed' code.

Assume a code A with good cross-correlation, but bad auto-correlation properties and assume a code B with good cross-correlation and good auto-correlation properties, then a new code can be constructed with good cross-correlation properties and an auto-correlation profile containing several, equally-spaced peaks. The distance between the peaks is the length of code B, and the number of peaks is the length of code A.

Code families can be constructed with predictable properties, of any given length (extensive investigation required to search for exact quality transfer capabilities).

A consequence of examples 1 to 5 is that manipulation allows to have any code of a certain length in some set. Fence spectral properties, autocorrelation profile, etc. can be influenced in this way.

EXAMPLE 6
A Method for a PN-code Fast Acquisition, Using Codes with Equally Spaced Peaks Given a code with not one, but several equally-spaced auto-correlation peaks, it is possible to reduce the acquisition time with the following algorithm:
1. Search for any auto-correlation peak in the code using any method;
2. Test for the validity of the choice (since there are several possibilities) e.g. by demodulating a few bits;
3. If the choice is not correct, immediately test the next auto-correlation peak. The position of this peak is already known, since they are equidistant;
4. If the choice is valid, the acquisition is obtained.

The advantage here is the dramatically reduced acquisition time, required for long codes.

EXAMPLE 7
A Method to Guarantee An Even Cross-correlation On the First Symbol Sent The symbols are sent out twice, in order to guarantee the first symbol always being in the presence of even cross-correlation only. This can be further extended by also providing a repetition before the symbol of interest (to allow both mutually advanced and retarded simultaneous links). The technique can be optimized by a PARTIAL duplication before and after the symbol of interest, just enough to provide even cross correlation in all circumstances.(This requires an adaptation of the active integration times at the base station).

EXAMPLE 7 A
code: 1101011101
extended code: 1011101011101110

In cases were only a limited set of codes is required (and furthermore the external interference rejection rather than the capacity of the system is important), full-zero even cross correlation can be obtained always, by applying the technique of doubling the data bits sent out.

In the two cases above, zero self-noise is obtained during tracking.

If the propagation delay between base station (gateway, hub, headend, . . . ) and user terminal is too high, it can be possible that synchronization within 1 symbol period (or within N chips) is impossible by simple TDD. In this case, a relaxed pilot concept (cfr. BLQS-CDMA R. De Gaudenzi) can be applied, still preserving the zero self-noise achievement. So this becomes also valid for satellite communications networks.

EXAMPLE 7 B
A Cellular Network

The capacity of a cellular network or any other network that is interference-limited can be increased with the described technique. An important consequence and advantage of the zero self-noise property is the fact that tight transmit power control can be relaxed or even becomes obsolete.

What is still of importance however is the multipath degradation. In order to solve this, systems like IS-95 networks use Gold code scrambling to ameliorate the auto-correlation profile of the proposed codes. However, by applying the RULES above, the start set of orthogonal codes is scrambled and randomized, resulting in better autocorrelation properties.

Calculations for Cellular Network

Suppose a symbol rate of 5 kSps and a cell radius of 5 km. The worst case direct path propagation time then equals:

$$10 \cdot 10^3 \cdot 5 \cdot 10^3 / 3 \cdot 10^8 = \frac{1}{6} \text{th symbol period}$$

This means that for a code length 16, three consequent zero's need to exist in the mutual even cross-correlation's. As more processing gain is left, due to minimized or zero self-noise, the FEC overhead can be minimized as well, again contributing to higher capacity. Otherwise, short codes will give rise to the best chances for relatively long runs of even zero cross-correlation. But this is good, as the absolute time of even zero cross-correlation is important, in the light of catching the propagation time uncertainty. The smaller channels, resulting from the shorter codes, can suffer more co-channel interference (overlapping channels) due to the higher processing gain available.

EXAMPLE 8
An Apparatus (Implemented Network) with a TDD Layer for the OS-CDMA Return Link, Dynamic Code Allocation and Contention Resolution The implementation of the network, as shown in FIG. 1, is based on 3 sub-cycles:
1.: Sub-Cycle 1 (Log-On Phase)
   The MASTER transmits a cell identifier and a list of free codes (or code sets) to be used by the SLAVES in the Collision Resolving Phase. The MASTER uses a reserved PN-Code, the "MASTER-broadcast-code". The SLAVES are in standby mode and are searching for this message. Ones the message has been received, the transmitters of the SLAVES will be synchronized. An FFT was also taken, so a precompensated carrier can be used in the next sub-cycle.

2.: Sub-Cycle 2 (Collision Resolving Phase)

All the SLAVES try to transmit with one code from the list, selected randomly. The start epochs of the different SLAVES will be synchronized as good as possible, in order to reduce the cross-correlation energy as much as possible. The precompensated carrier is used here, so the MASTER can start demodulation without taking an FFT (replacing the FFT to the MASTER would result in higher bit error probability because of false FFT peaks resulting from noise. Noise received by SLAVE is lower because of pure S-CDMA transmission by Base Station).

During sub-cycle 2, all the receivers of the SLAVES are freewheeling.

3.: Sub-Cycle 3 (Acknowledging Phase)

The MASTER answers all messages it could demodulate, but due to collisions (e.g. SLAVES using the same code) it is possible that not all messages are received. SLAVES can lock in directly because in sub-cycle 1, they have taken an FFT and performed acquisition. In sub-cycle 2, they have been freewheeling. SLAVES that didn't got an answer, can repeat sub-cycles 2 and 3. SLAVES that got an answer, can use sub-cycle 2 to send a new message.

EXAMPLE 9

A Method for Constructing Orthogonal Non-binary Digital Codes of Length N, with N Integer Let S be a set of N mutually orthogonal vectors in an N-dimensional vector space, defined with the operations "+" (addition of vectors) and "·" (scalar product of vectors). Each vector can be represented by its coordinates with respect to the unity base in the defined vector space. By definition, the scalar product of every 2 vectors out of the set S is equal to zero.

Now one views these coordinates representations as digital sequences of a set of digital codes. The cross-correlation of each pair of sequences out of the set S, defined as:

$$\Sigma(Ai*Bi) i=1 \text{ to } N$$

is equal to zero, because the corresponding vectors are orthogonal, and the cross-correlation definition is equivalent to the scalar product of the corresponding vectors.

EXAMPLE 9 A (1,0,0,0,0)
(0,1,0,0,0)
(0,0,1,0,0)
(0,0,0,1,0)
(0,0,0,0,1)

is the unity base in the 5-dimensional vector space V,+, ·. when applying these coordinates as digital codes, the 1's correspond to activity (burst), end the 0's correspond to the off-state. The manipulation mechanisms explained above are also applicable here. The applicability of this code generation technique lies in the fact that orthogonal code sets can be obtained for any length. A set is constructed starting from a base, consisting of unity vectors, and then consecutive base transformations are applied, yielding a new base. In the new base, arbitrary gains can be applied to each vector, yielding an orthogonal codes set.

EXAMPLE 9 B

Example of construction of a non-binary orthogonal code set of length 5, starting from a base of the 5-dimensional vector space V, +,·

(1,0,0,0,0) V1
(0,1,0,0,0) V2
(0,0,1,0,0) V3
(0,0,0,1,0) V4
(0,0,0,0,1) V5

Suppose one applies subsequent transformations on 2 vectors Ai and Aj as such:

$$Ai \rightarrow Aj + \text{mod}(Aj)/\text{mod}(Ai)*Ai$$

$$Aj \rightarrow Ai - \text{mod}(Ai)/\text{mod}(Aj)*Aj$$

Then one obtains a new set which is still orthogonal, i.e. the scalar vector product: Ai·Aj=0

This transformation rotates 2 orthogonal vectors, in the plane defined by these vectors, over 45 degrees, and provides a gain of 1/0.707

Example:

| | | | |
|---|---|---|---|
| (1, 0, 0, 0, 0) V1 | (1, 1, 0, 0, 0) V1+V2 | -> | V1 mod(V1) = 1.41 |
| (0, 1, 0, 0, 0) V2 | (1, -1, 0, 0, 0) V1-V2 | -> | V2 mod(V2) = 1.41 |
| (0, 0, 1, 0, 0) V3 | (0, 0, 1, 1, 0) V3+V4 | -> | V3 mod(V3) = 1.41 |
| (0, 0, 0, 1, 0) V4 | (0, 0, 1, -1, 0) V3-V4 | -> | V4 mod(V4) = 1.41 |
| (0, 0, 0, 0, 1) V5 | (0, 0, 0, 0, 1) V5 | -> | V5 mod(V5) = 1 |
| (1, 1, 0, 0, 0) | V1 | -> | V1 mod(V1) = 1.41 |
| (1, -1, 0, 0, 0) | V2 | -> | V2 mod(V2) = 1.41 |
| (0, 0, 1, 1, 0) | V3 | -> | V3 mod(V3) = 1.41 |
| (0, 0, 0.707, -0.707, 1) | V5 + 1/1.41 V4 | -> | V4 |
| (0, 0, 1, -1, 1.41) | V4 - 1.41/1 V5 | -> | V5 |

The advantage of this method is that a fully orthogonal set can be defined for any dimension (code length).

EXAMPLE 10

A Method to Generate a Waveform with a Plurality of Orthogonal PN Codes, to Modulate a Plurality of Data Streams, Together with a Non-orthoconal PN-code, Having Good Autocorrelation Properties This method comprises the steps of:

1. Take a plurality of orthogonal codes (e.g. using the techniques mentioned above) that are used to spread a plurality of data streams;
2. combine each of said spread data streams with in-phase BPSK modulations, and perform the addition, after optional gain control of each spread stream;
3. Define a PN-code with good autocorrelation properties, and combine said code with BPSK modulation, which is is orthogonal (90 degrees out-of-phase) with the BPSK of step 2.;
4. Combine the signals of step 2 and of step 3 as a complex signal with time-aligned PN-codes.

Figure 2:
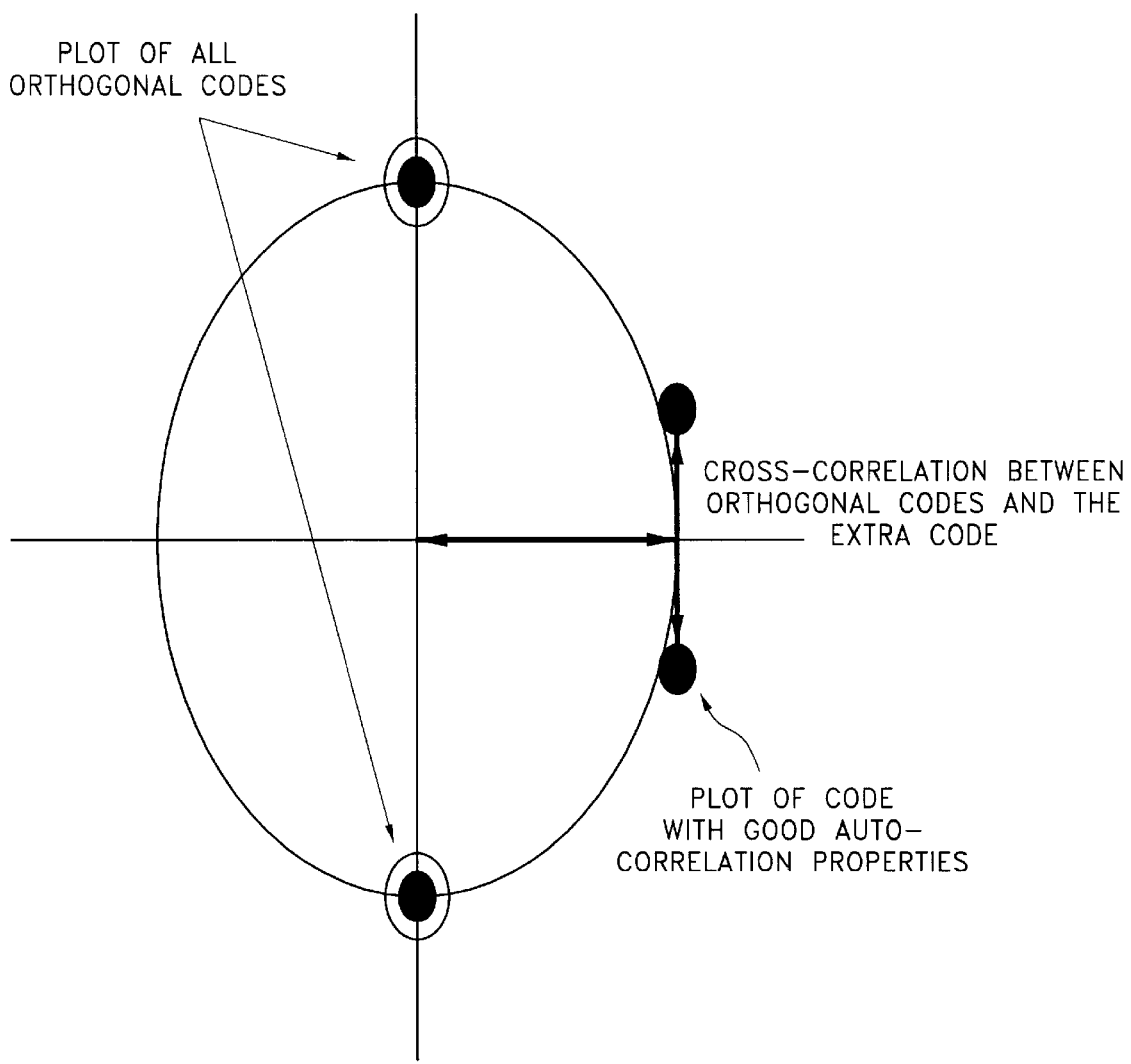
FIG. 2 illustrates the code set generated by a method of the invention wherein the quality of the signal is maintained due to the out-phase cross-correlation.

The advantage of this code set is that there is a code with good autocorrelation properties, so acquisition can be done without problems. The cross-correlation properties between the orthogonal codes of step 2 and the code of step 3, do not influence the quality of the signal because it is "out-phase cross-correlation" (see FIG. 2).

EXAMPLE 11

A Method to Demodulate the Above Waveform

The method comprises the steps of:

1. Search the PN Code start of said code with good autocorrelation properties;
2. Track said PN code with good autocorrelation properties;
3. Despread and demodulate said data streams which are time-aligned with said PN-code with good autocorrelation properties.

What is claimed is:

1. A method to generate a waveform with a plurality of orthogonal PN codes, to modulate a plurality of data streams, together with a non-orthogonal PN-code, having good auto-correlation properties, comprising the steps of:

Taking a plurality of orthogonal codes that are used to spread a plurality of data streams;

Combining each of said spread data streams with in-phase BPSK modulations, and performing an addition, after optional gain control of each spread stream to obtain first signals;

Defining a PN-code with good auto-correlation properties, and combining said code with BPSK modulation, which is orthogonal (90 degrees out-of-phase) with said BPSK modulations to obtain second signals;

Combining said first and second signals as a complex signal with time-aligned PN-codes.

2. A method to demodulate said waveform of claim 1, comprising the steps of:

searching the PN Code start of said code with good auto-correlation properties;

Tracking said PN code with good auto-correlation properties;

Despread and demodulate said data streams which are time-aligned with said PN-code with good auto-correlation properties.

3. An apparatus for generating and demodulating of said waveform of claim 1.

4. The apparatus of claim 3, wherein said apparatus is comprised in an Integrated circuit.

* * * * *